US010653114B2

(12) United States Patent
So et al.

(10) Patent No.: US 10,653,114 B2
(45) Date of Patent: May 19, 2020

(54) RECONFIGURABLE ANIMAL TRANING APPARATUS AND SYSTEM

(71) Applicant: E-Collar Technologies, Inc., Garrett, IN (US)

(72) Inventors: Ho-Sung So, Seoul (KR); Dowon Kim, Ansan-si (KR)

(73) Assignee: E-Collar Technologies, Inc., Garrett, IN (US)

( * ) Notice: Subject to any disclaimer, the term of this patent is extended or adjusted under 35 U.S.C. 154(b) by 1138 days.

(21) Appl. No.: 14/865,912

(22) Filed: Sep. 25, 2015

(65) Prior Publication Data

US 2016/0100552 A1    Apr. 14, 2016

(30) Foreign Application Priority Data

Oct. 14, 2014    (KR) .................. 10-2014-0138507

(51) Int. Cl.
| A01K 15/00 | (2006.01) |
| A01K 15/02 | (2006.01) |
| A01K 27/00 | (2006.01) |
| G08C 17/02 | (2006.01) |

(52) U.S. Cl.
CPC .......... *A01K 15/021* (2013.01); *A01K 15/022* (2013.01); *A01K 15/029* (2013.01); *A01K 27/001* (2013.01); *A01K 27/009* (2013.01); *G08C 17/02* (2013.01)

(58) Field of Classification Search
CPC ............................... A01K 15/00; A01K 15/02
USPC .......................................... 119/712, 719–721
See application file for complete search history.

(56) References Cited

U.S. PATENT DOCUMENTS

| 5,922,363 | A | * | 7/1999 | Beck | ................... | B29C 45/1603 |
| | | | | | | 264/241 |
| 6,019,066 | A | * | 2/2000 | Taylor | .................. | G11B 31/003 |
| | | | | | | 119/719 |
| 6,131,535 | A | | 10/2000 | So | | |
| 6,474,269 | B2 | * | 11/2002 | So | ........................ | A01K 15/021 |
| | | | | | | 119/719 |
| 6,860,240 | B2 | | 3/2005 | Kim et al. | | |
| 7,222,589 | B2 | | 5/2007 | Lee, IV et al. | | |
| 7,779,788 | B2 | * | 8/2010 | Moore | ................. | A01K 15/023 |
| | | | | | | 119/721 |

(Continued)

FOREIGN PATENT DOCUMENTS

| KR | 10-1996-0013184 | 5/1996 |
| KR | 10 2011 0044446 | 4/2011 |

*Primary Examiner* — Richard T Price, Jr.
(74) *Attorney, Agent, or Firm* — Taylor IP, P.C.

(57) ABSTRACT

An animal training apparatus including a stimulation generator/stimulator module to generate the stimulation and deliver the stimulation to the animal, and a microprocessor comprising control logic programmed to control the stimulation generator/stimulator module to deliver the stimulation to the animal when a preset condition is satisfied, wherein at least a portion of the control logic is reprogrammable by a user. Also, an animal training system further includes a remote controller to control the animal training apparatus, wherein at least a portion of user input or functions of the remote controller is reconfigurable by the user. The user may reset, reconfigure, and reprogram the control logic of the animal training apparatus or the user input of the remote controller, or various functions provided by the animal training system.

12 Claims, 8 Drawing Sheets

(56) References Cited

U.S. PATENT DOCUMENTS

| | | | | |
|---|---|---|---|---|
| 7,819,087 | B2* | 10/2010 | Napolez | A01K 15/021 119/721 |
| 8,833,309 | B2* | 9/2014 | So | A01K 15/021 119/712 |
| 8,869,748 | B2* | 10/2014 | Yin | A01K 15/021 119/51.02 |
| 8,881,686 | B2* | 11/2014 | So | A01K 15/021 119/712 |
| 8,887,670 | B2* | 11/2014 | So | A01K 15/021 119/712 |
| 8,955,462 | B1* | 2/2015 | Golden | A01K 11/008 119/721 |
| 8,979,757 | B2* | 3/2015 | Mottram | A01K 11/00 119/421 |
| 8,988,230 | B2* | 3/2015 | Nohara | A01M 29/06 119/713 |

* cited by examiner

FIG. 6

(a)
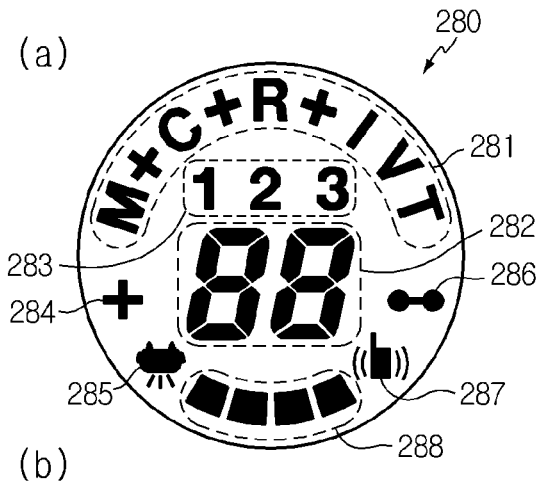

(b)

| | Description | Remarks |
|---|---|---|
| M | Momentary Stimulation | Sends Single Pulse of Stimulation |
| M+ | Momentary Boost Stimulation | Sends Single Pulse of Boosted Stimulation |
| C | Continuous Stimulation | Sends Continuous Pulses of Stimulation |
| C+ | Continuous Boost Stimulation | Sends Continuous Pulses of Boosted Stimulation |
| R | Ramp Stimulation | Ramps Stimulation from 0 to Level Set by Dial |
| R+ | Ramp Boosted Stimulation | Ramps Stimulation from 0 to Boosted Level |
| I | Instant Stimulation Mode | Dial Controls Stimulation for up to 30 Seconds |
| V | Vibration | Vibration |
| T | Tone | Tone can be a Warning or a Good Dog Marker |
| + | Boost Level Setting | Sets Boost Level for Each Dog |
| 🔦 | Collar Receiver Tracking Light | Turn ON/OFF Night Tracking Collar Receiver Light |
| ((▪)) | Lost Transmitter | 6 Hours Timer Setting for Lost Transmitter Beeper |
| ●–● | Pairing/Synchronizing Collar Receivers | Allows for "In the Field" Pairing of Receivers |
| 1 2 3 | Selection of Multi Dog Operation | Multi Dog Mode indicator |
| 88 | Stimulation Level Indication | 0 to 100 Levels of Precision Stimulation |
| ▰▰▰ | Battery Indicator | Indicates Transmitter Battery Level |

…

RECONFIGURABLE ANIMAL TRANING APPARATUS AND SYSTEM

CROSS-REFERENCE TO RELATED APPLICATIONS

The present application claims priority to Korean Patent Application No. 10-2014-0138507 filed in the Republic of Korea on Oct. 14, 2014, the disclosures of which are incorporated herein by reference.

BACKGROUND

The present disclosure relates to an electronic animal training apparatus and system that is worn on the body of an animal such as a dog or a cat to deliver stimulation to train the animal or correct the animal's behavior.

In the field of animal training, owners or trainers (hereinafter referred to as 'users') have employed various electric and electronic technologies in correcting animal behaviors since the late 1960s. For example, U.S. Pat. No. 7,222,589 discloses a collar type device having a sensor to detect a dog barking and an electrical stimulator to deliver an electrical stimulus to the dog, in which an electrical stimulus is delivered to a dog having the collar type device worn around the neck when the sensor detects the dog barking. Also, U.S. Pat. No. 6,131,535 discloses an animal training system including a collar type device and a remote controller possessed by a user that conducts radio-frequency wireless communications with the collar type device, in which the user takes control to deliver stimulation such as electrical stimulation to the collar type device through the remote controller when a dog does a bad behavior such as barking, attacking a human or going beyond a preset boundary.

Using such electronic animal training devices or systems, animals may learn good behaviors. Also, electronic animal training devices or systems have advanced by employing electronic and communication technologies that are developing day by day, and are gaining excellent effects in training hunting dogs or pets.

Typically, target animals to which animal training devices or systems deliver stimulation for the purpose of training are dogs, but may be cats or other pets or livestocks. Also, where a target animal is, for example, dogs, there are various types of dogs including hunting dogs, military dogs, guide dogs, and pet dogs, and the size of dogs and the extent of training varies. Thus, because effective stimulation varies in type or intensity (sensitivity to stimulation) depending on the type or size of target animals and the degree of training, stimulation suitable for a certain animal may be too strong or weak to other animals.

Further, a remote controller which a user possesses and uses has an input means such as a button, a switch, and a knob to select/determine or control the type or intensity, duration, and mode of various stimulations. However, with the development of animal training devices, the number of input means increases to support an increased number of various functions, but for device minimization, there is a need to reduce the number of input means and a space in which an input means is arranged. Thus, advanced remote controllers are adopting a complex operation method by which a plurality of functions is assigned to one input means (a switch or a button), and to perform a particular function, a long press is made or short presses are made consecutively, or two input means are pressed at the same time. Moreover, remote controllers (animal training systems) have different arrangements or layouts of input means for each manufacturer or product model, so users have to be accustomed to new arrangement layout of input means when they purchase new products. Further, if configuration of input means designed for right-handed users may be adapted for left-handed users, it will be convenient.

To meet the demand or need, state-of-the-art animal training devices or systems allow users to adjust some of the types or intensities, modes, and functions of stimulation to be adapted for target animals. Further, with a slide switch or a rotary switch, users are allowed to select combinations of functions assigned to each input means (button) although such selections are made within an extremely limited range.

However, a range in which users can change by this traditional partial adjustment or selection of function combinations is extremely limited. Particularly, with the development of technology, enormous functions are provided by animal training devices or systems, while in reality, functions being frequently used by users are merely a few, and animal training devices or systems that may freely assign only functions desired by users to a limited number of input means (buttons) are not commercialized yet.

SUMMARY

The present disclosure provides technology for an electronic animal training apparatus or system for training an animal or correcting the animal's behavior in which a user may reprogram the type, intensity, mode, or function of stimulation, or reconfigure an arrangement layout of input means of a remote controller easily and freely.

An animal training apparatus according to one aspect of the present disclosure is worn on an animal to deliver stimulation for scolding or encouraging the animal when the animal does or does not do a particular behavior, and includes a stimulation generator/stimulator module to generate the stimulation and deliver the stimulation to the animal, and a microprocessor comprising control logic programmed to control the stimulation generator/stimulator module to deliver the stimulation to the animal when a preset condition is satisfied, wherein at least a portion of the control logic is reprogrammable by a user.

The animal training apparatus may further include a communication interface to electrically connect the microprocessor to an external computer terminal wiredly or wirelessly, and wherein reprogramming of the at least a portion of the control logic is executed by the external computer terminal using the communication interface.

The control logic of which the at least a portion is reprogrammable may be logic that determines whether the preset condition is satisfied.

In this instance, the animal training apparatus may further include a sensor to detect whether the animal did or did not do the particular behavior, and may allow the logic to determine whether the preset condition is satisfied based on an intensity of a signal outputted from the sensor.

Also, the control logic of which the at least a portion is reprogrammable may be logic that sets at least one of a type, a duration, and an intensity of the stimulation to be delivered to the animal.

Also, the animal training apparatus may further include a sensor to detect whether the animal did or did not do the particular behavior, and the logic may be reprogrammable to set at least one of the type, the duration, and the intensity of the stimulation based on the intensity of the signal outputted from the sensor.

An animal training system according to another aspect of the present disclosure includes an animal training apparatus worn on an animal to deliver stimulation to the animal and a remote controller possessed by a user to control the animal training apparatus, the remote controller and the animal training apparatus configured to communicate with each other via wireless communication, the animal training apparatus including a stimulation generator/stimulator module to generate the stimulation and deliver the stimulation to the animal, a wireless communication module to receive a signal from the remote controller, and a microprocessor configured to control the stimulation generator/stimulator module to deliver the stimulation to the animal based on the signal received by the wireless communication module, and the remote controller including a user input means to select a particular stimulation mode from a plurality of stimulation modes differing in type, duration, and/or intensity of the stimulation to be delivered by the animal training apparatus or a particular function from a plurality of functions provided by the animal training system and input an execution command of the selected stimulation mode or function, a wireless communication module to transmit signals representing the stimulation mode or function selected by the user input means to the animal training apparatus, and a microprocessor to process the signals and control the wireless communication module, wherein at least a portion of the user input means or functions is reconfigurable by the user.

The remote controller may further include a communication interface to electrically connect the microprocessor of the remote controller to an external computer terminal wiredly or wirelessly, and reconfiguration of the at least a portion of the user input means or functions may be carried out by the external computer terminal using the communication interface.

Also, the remote controller may further include a display to display currently set stimulation modes or functions in the form of an icon and/or a message, the user input means of the remote controller may include a plurality of buttons each assigned corresponding to a particular stimulation mode or a particular function, reconfiguration of the at least a portion of the user input means or functions may be carried out by the user pressing a particular button among the plurality of buttons, and the reconfiguration process may be displayed on the display.

Also, the user input means of the remote controller may include a plurality of buttons each assigned corresponding to a particular stimulation mode or a particular function, and a corresponding relationship between the plurality of buttons and the plurality of stimulation modes or functions may be reconfigurable by the user.

The animal training system may include one remote controller and a plurality of animal training apparatuses each worn on different animals, the plurality of buttons may be assigned corresponding to the animal training apparatuses worn on the different animals singularly or in group to simultaneously train the plurality of animals with one remote controller, and a corresponding relationship between the plurality of buttons and the plurality of animal training apparatuses may be reconfigurable by the user.

Also, the plurality of buttons may include a lock function of setting and locking an intensity and/or a duration of stimulation to be delivered to each animal wearing each of the plurality of animal training apparatuses independently for each animal training apparatus, and setting or unlocking of the lock function and/or the intensity and/or duration of stimulation to be delivered to each animal may be reconfigurable by the user.

The plurality of stimulation modes may include a maximum stimulation restriction mode in which despite the user's command to deliver stimulation exceeding a preset maximum value of intensity and/or duration of stimulation to be delivered to the animal, the stimulation is limited to the preset maximum value and is delivered to the animal, and setting or releasing of the maximum stimulation restriction mode and/or the maximum value may be reconfigurable by the user.

Also, the user input means of the remote controller may include a dial to adjust the intensity of stimulation to be delivered to the animal, and the plurality of stimulation modes include a ramp mode in which the stimulation may be delivered with the intensity of stimulation to be delivered to the animal increasing from 0 to an intensity set by the dial.

Also, the plurality of stimulation modes may include a boost mode in which the stimulation is delivered with the intensity of stimulation to be delivered to the animal increasing from a currently set intensity by a predetermined amount, and the predetermined amount increasing in the boost mode may be reconfigurable by the user.

The user input means of the remote controller may include a dial to adjust the intensity of stimulation to be delivered to the animal, and the plurality of stimulation modes includes an instant mode in which the stimulation may be delivered to the animal with the intensity of stimulation set by the dial by manipulating only the dial for a preset time.

Also, the animal training apparatus may further include a light emitting means, and the plurality of function may include a function of lighting the light emitting means by the remote controller.

Also, the remote controller may further include a beeper, and the plurality of functions may include a function of activating the beeper when a preset time passes.

BRIEF DESCRIPTION OF DRAWINGS

FIG. 6 shows an enlarged diagram (a) of a display of a remote controller shown in FIG. 3 and a table (b) describing each icon on the display.

DETAILED DESCRIPTION

Hereinafter, an animal training apparatus and an animal training system according to the present disclosure is described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. The description proposed herein is just a preferable example for the purpose of illustrations only, not intended to limit the scope of the disclosure, so it should be understood that other equivalents and modifications could be made thereto without departing from the spirit and scope of the disclosure.

Figure 1:
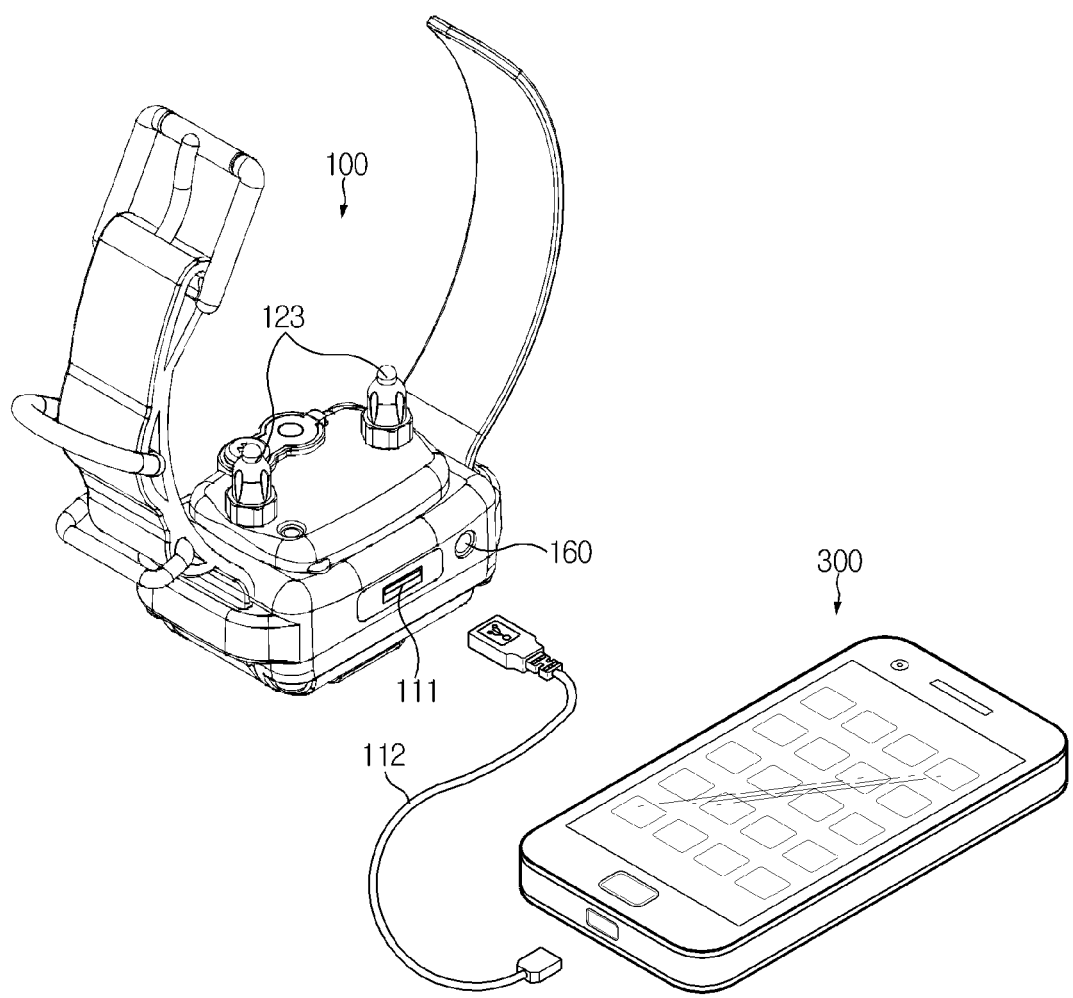
FIG. 1 is a perspective view illustrating a reprogrammable animal training apparatus according to an exemplary embodiment of the present disclosure and an external computer terminal for reprogramming.
Figure 2:
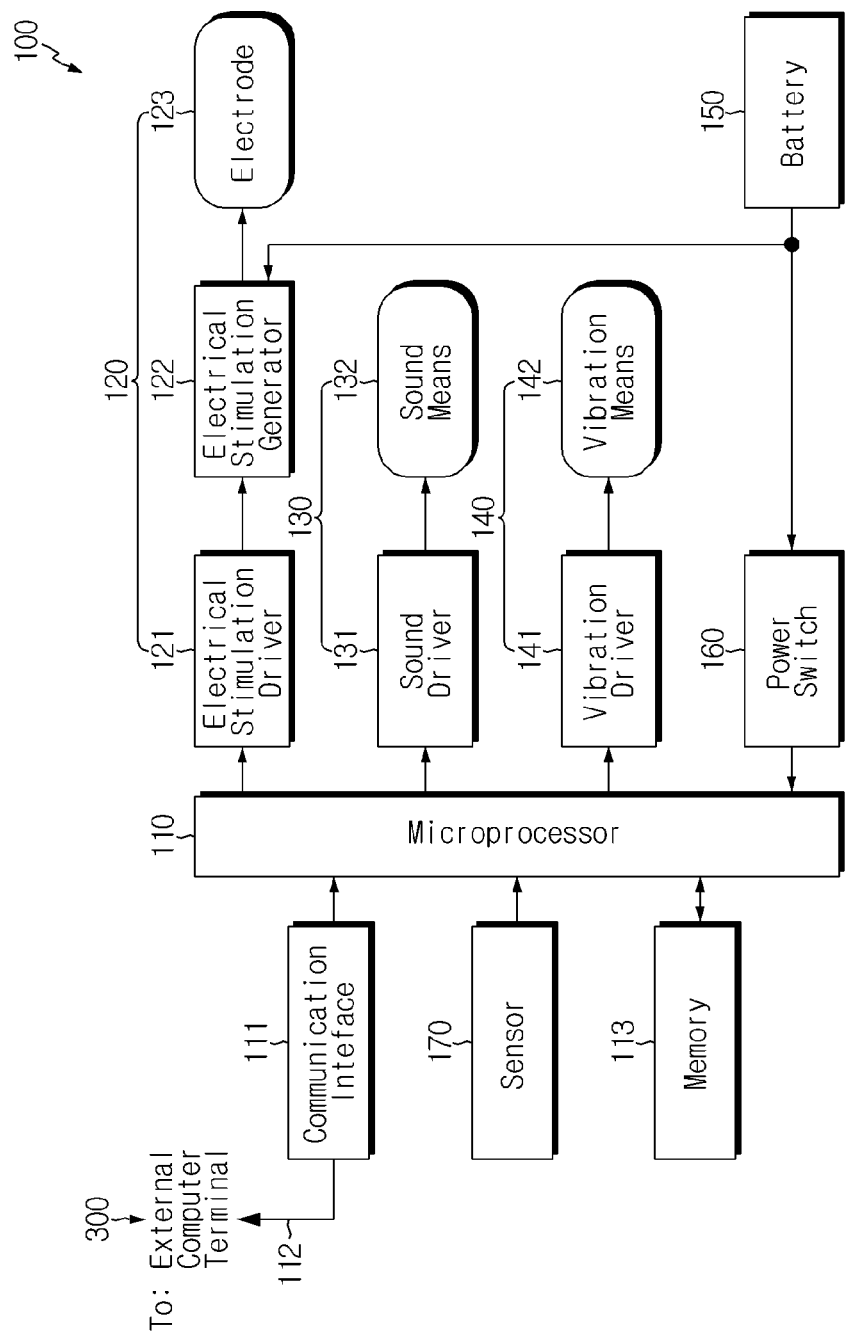
FIG. 2 is a block diagram illustrating components of the animal training apparatus shown in FIG. 1.

FIG. 1 is a perspective view illustrating a reprogrammable animal training apparatus according to an exemplary embodiment of the present disclosure and an external computer terminal for reprogramming, and FIG. 2 is a block diagram of the animal training apparatus.

The animal training apparatus 100 of this embodiment shown in FIGS. 1 and 2 is a general electronic animal training apparatus used to train an animal (typically, a dog, but the present disclosure is not limited thereto) or correct the animal's behavior, and is worn around the animal's neck. Thus, the animal training apparatus 100 has elements of a general animal training apparatus, for example, a stimulation generator/stimulator module, a microprocessor, a battery, and a necessary sensor.

The stimulation generator/stimulator module includes a stimulator means and its driver employed by a general electronic animal training apparatus, and stimulation typically includes electrical stimulation, sound stimulation, and vibration stimulation.

The stimulation generator/stimulator module for delivering electrical stimulation to the animal is implemented as an electrical stimulation generator/stimulator 120, and specifically, may include an electrical stimulation driver 121, an electrical stimulation generator 122, and an electrode 123.

The electrical stimulation driver 121 converts a signal of stimulation intensity instructed by a microprocessor 110 to an analog signal recognizable by the electrical stimulation generator 122 and outputs the same to drive the electrical stimulation generator 122. The electrical stimulation generator 122 generates an electrical pulse having current of, for example, from about 50 µA to about 100 mA and voltage of from about 50V to about 10,000V using a transformer. The electrode 123 is a stimulator means which comes into contact with the animal's body (typically, the neck) to deliver the electrical pulse generated by the electrical stimulation generator 122 to the animal. The microprocessor 110 may variously adjust the electrical stimulation delivered to the animal by adjusting the intensity (amplitude, voltage), frequency, duration (pulse width), interval, pulse ratio, duty cycle, and repetition ratio of the electrical pulse through the electrical stimulation driver 121 based on the specification of the electrical stimulation generator 122.

The stimulation generator/stimulator module for delivering sound stimulation to the animal is implemented as a sound stimulation generator/stimulator 130, and specifically, may include a sound driver 131 and a sound means 132.

The sound driver 131 converts a signal of stimulation intensity instructed by a microprocessor 110 to a signal recognizable by the sound means 132 and outputs the same to drive the sound means 132. The sound means 132 is implemented as a buzzer, a piezoelectric device or a speaker to generate a sound pulse of frequency audible to the animal. The microprocessor 110 may variously adjust the sound stimulation delivered to the animal by adjusting the intensity (amplitude), frequency, duration (pulse width), interval, pulse ratio, duty cycle, and repetition ratio of the sound pulse through the sound driver 131 based on the specification of the sound means 132.

The stimulation generator/stimulator module for delivering vibration stimulation to the animal is implemented as a vibration stimulation generator/stimulator 140, and specifically, may include a vibration driver 141 and a vibration means 142.

The vibration driver 141 converts a signal of stimulation intensity instructed by a microprocessor 110 to a signal recognizable by the vibration means 142 and outputs the same to drive the vibration means 142. The vibration means 142 is implemented as a vibration motor or a piezoelectric device to generate a vibration pulse. The microprocessor 110 may variously adjust the vibration stimulation delivered to the animal by adjusting the intensity (amplitude), frequency, duration (pulse width), interval, pulse ratio, duty cycle, and repetition ratio of the vibration pulse through the vibration driver 141 based on the specification of the vibration means 142.

Besides, light from a light-emitting diode (LED) lamp may be used as a stimulation source. Each of the drivers 121, 131, and 141 and each of the stimulation generator/stimulator means 122, 132, and 142 driven by the drivers is logically distinguished, and may be physically incorporated into one device.

A battery 150 supplies required power to each component of the animal training apparatus 100, especially the microprocessor 110 and the stimulation generator/stimulator module 120, 130, and 140, and preferably includes a rechargeable secondary battery.

A power switch 160 is a power switch which switches ON/OFF the animal training apparatus 100.

Although not shown in the drawing, the animal training apparatus 100 may be equipped with a display to display a remaining amount of the battery 150 or the type or mode of the stimulator means currently in operation.

A sensor 170 detects the animal's behavior such as barking and a motion, and may include various types of sensors based on a specific behavior intended to detect.

For example, when the animal training apparatus 100 of the present disclosure is used as an animal behavior correcting apparatus which detects an animal barking, and to train the animal not to bark, delivers stimulation to the animal, the sensor 170 may be a piezoelectric sensor which detects vocal cords of the animal vibrating or a microphone which detects the animal barking.

Also, when the animal training apparatus 100 of the present disclosure is used as an animal behavior correcting apparatus which detects an animal going out of a preset area or approaching the area, and to train the animal not to do so, delivers stimulation to the animal, the sensor 170 may be a sensor that senses a signal (electromagnetic wave, ultrasonic wave, and infrared light) from a transmitter (a wire buried in the ground or a radio-frequency, ultrasonic or infrared transmitter installed at a point) installed at the area or its boundary, or an image sensor that senses a particular mark installed at the area or its boundary.

Further, the sensor 170 may be a gyro sensor or an acceleration sensor that detects a motion of an animal.

The microprocessor 110 controls the operation of the animal training apparatus 100 including the stimulation generator/stimulator module 120, 130, and 140. The microprocessor 110 is typically implemented as an integrated circuit (IC) chip, and may have a necessary memory 113 or register, and the operation of the microprocessor 110 may be implemented as control logic programmed in software, firmware, and a hardwired logic.

The microprocessor 110 receives an input of the signal from the sensor 170, and when a preset condition is satisfied, that is, for example, the intensity of the signal from the sensor 170 exceeds a preset reference value, the microprocessor 110 controls the stimulation generator/stimulator module 120, 130, and 140 to deliver stimulation to the animal. In this instance, when the intensity of the signal from the sensor 170 exceeds the preset reference value, the microprocessor 110 may control the stimulation generator/stimulator module 120, 130, and 140 to deliver stimulation with a preset type, duration, and/or intensity of stimulation, or may be programmed to deliver stimulation with varying types, durations, and/or intensities of stimulation based on the intensity of the signal from the sensor 170.

In this embodiment, at least a portion of the control logic of the microprocessor 110 is reprogrammable by the user. This reprogramming may be accomplished through a separate switch or button provided in the animal training apparatus 100, but is preferably accomplished through the external computer terminal 300 which is electrically connected to the animal training apparatus 100.

To do so, the animal training apparatus 100 has a communication interface to electrically connect the microprocessor 110 to the external computer terminal 300. Although the communication interface is implemented as a wired communication method including a universal serial bus (USB) port 111 and a USB communication cable 112 in the examples of FIGS. 1 and 2, the communication interface may be implemented as a wireless communication method such as, for example, Bluetooth.

Furthermore, for reprogramming of the control logic, an application program is installed in the external computer terminal 300 electrically connected to the animal training apparatus 100 with the communication interface to retrieve the control logic of the microprocessor 110 and change the same in response to an input from the user. Although the examples shown in FIGS. 1 and 2 illustrate the external computer terminal 300 as a smartphone, it is obvious that the external computer terminal may include a desktop computer, a laptop computer, and a tablet computer.

A process of reprogramming the control logic of the microprocessor 110 in the animal training apparatus 100 of this embodiment as described above is described.

First, a communication channel is built between the external computer terminal 300 and the animal training apparatus 100 using the communication interfaces 111 and 112, and concurrently, an application program installed in the external computer terminal 300 is executed.

Subsequently, the application program retrieves control logic (actually, a particular program code or data stored in the memory 113 or register) of the microprocessor 110 intended to change (reprogram), and displays the same on the display of the external computer terminal 300 in the form of a text or graphical icon readable by the user. Furthermore, the application program displays the control logic that may be changed by the user together with candidates of changeable or selectable ranges or values, and receives an input of an item (value) to change when the user selects a desired candidate from the candidates.

Subsequently, the application program controls the microprocessor 110 to change the corresponding program code or data of the memory 113 or register to change the control logic selected to change by the user to the item (value) selected by the user.

In the animal training apparatus 100 of this embodiment, typical examples of the reprogrammable control logic may include the following two.

First, logic that determines whether a preset condition is satisfied, a criterion used for the logic to determine whether the preset condition is satisfied may be reprogrammed. That is, the intensity of the signal from the sensor 170 corresponding to a criterion for determining whether scolding or encouraging is necessary when the animal does a particular behavior (barking or going out of the preset area) can be adjusted.

Second, logic that sets the type, duration, and/or intensity of stimulation to be delivered to the animal, at least one of the type, duration, and intensity of stimulation that are settable by the logic may be reprogrammed. That is, based on the intensity of the signal from the sensor 170, a reference value used to deliver stimulation by automatically changing the type, duration, and/or intensity of stimulation may be adjusted, or activation/inactivation of this mode (a mode in which the stimulation intensity changes based on the sensor signal intensity) may be changed.

Besides, it is possible to reprogram various functions of the animal training apparatus 100, for example, setting or changing a timer for automatic ON/OFF of the animal training apparatus 100, where there is a function of changing the animal training apparatus 100 to a sleeping mode when the motion detection sensor 170 does not output a signal for a predetermined time or more, that is, the animal does not move for a predetermined time or more, or in contrast, waking up from a sleeping mode when a motion or barking of the animal is detected, activation/inactivation of the function, setting or changing the predetermined time, and when the animal training apparatus 100 has a lightening means such as a LED lamp, setting or changing a time zone where ON/OFF of the lightening means is activated.

As described in the foregoing, the animal training apparatus of this embodiment allows the user to reset, reconfigure, and reprogram the control logic of the animal training apparatus 100 in a convenient, simple, and easy manner.

Although the embodiments described hereinabove show that the present disclosure consists of only an animal training apparatus, the present disclosure may be applied to a general animal training system including a remote controller possessed by a user and an animal training apparatus worn on an animal. Hereinafter, an animal training system according to another embodiment of the present disclosure is described.

Figure 3:
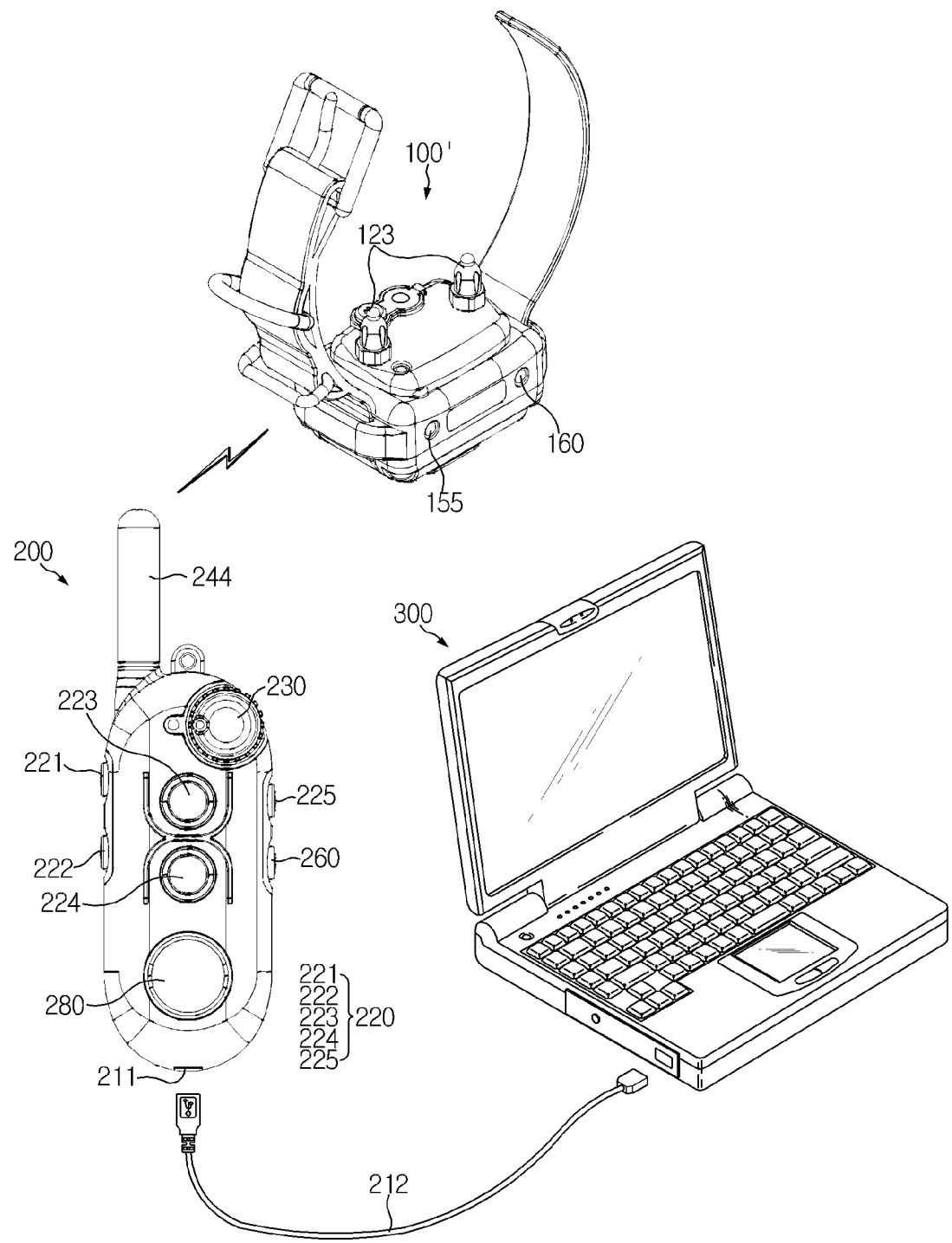
FIG. 3 is a perspective view illustrating a reconfigurable animal training apparatus according to another exemplary embodiment of the present disclosure and an external computer terminal for reconfiguration.
Figure 4:
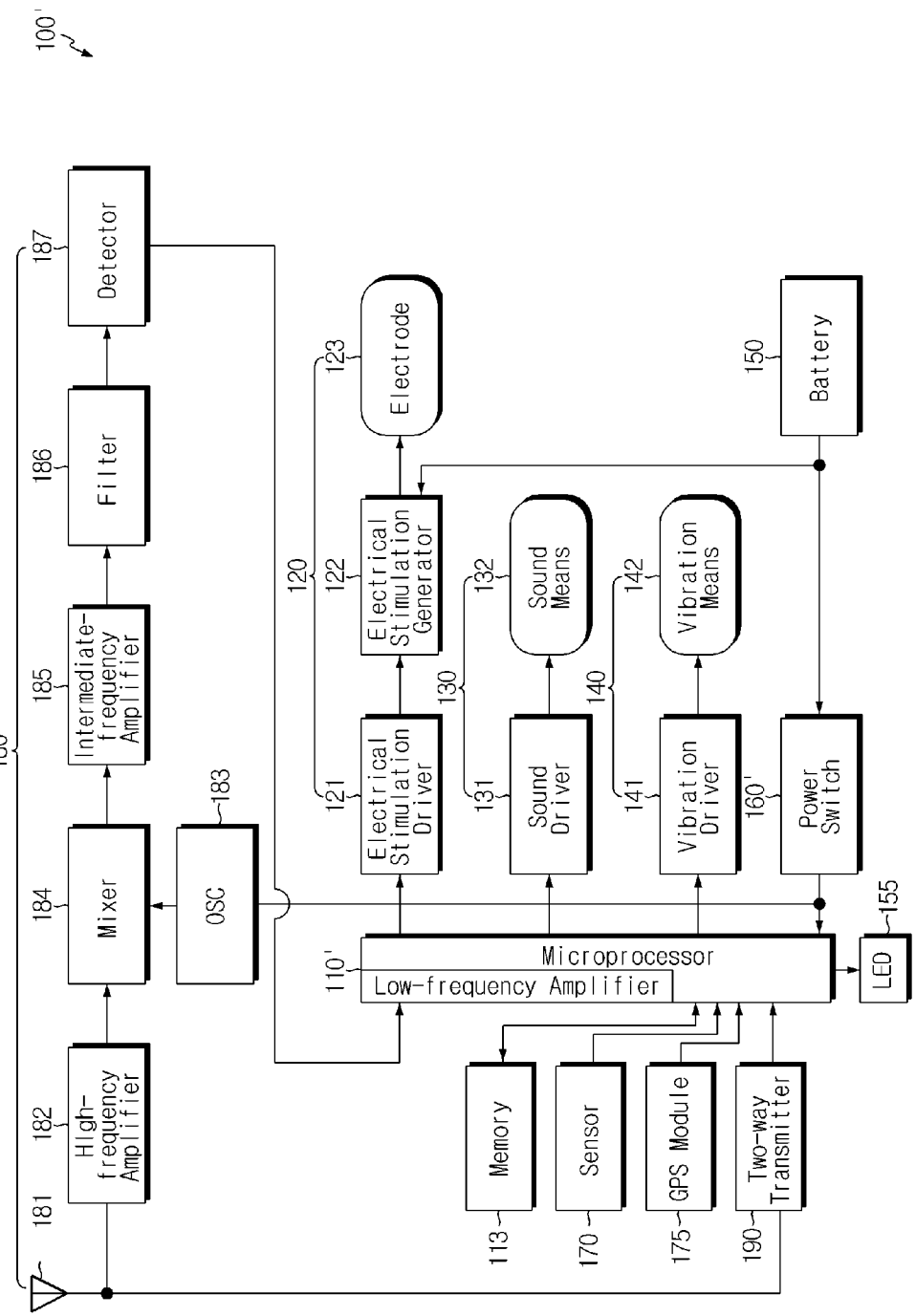
FIG. 4 is a block diagram illustrating components of the animal training apparatus shown in FIG. 3.
Figure 5:
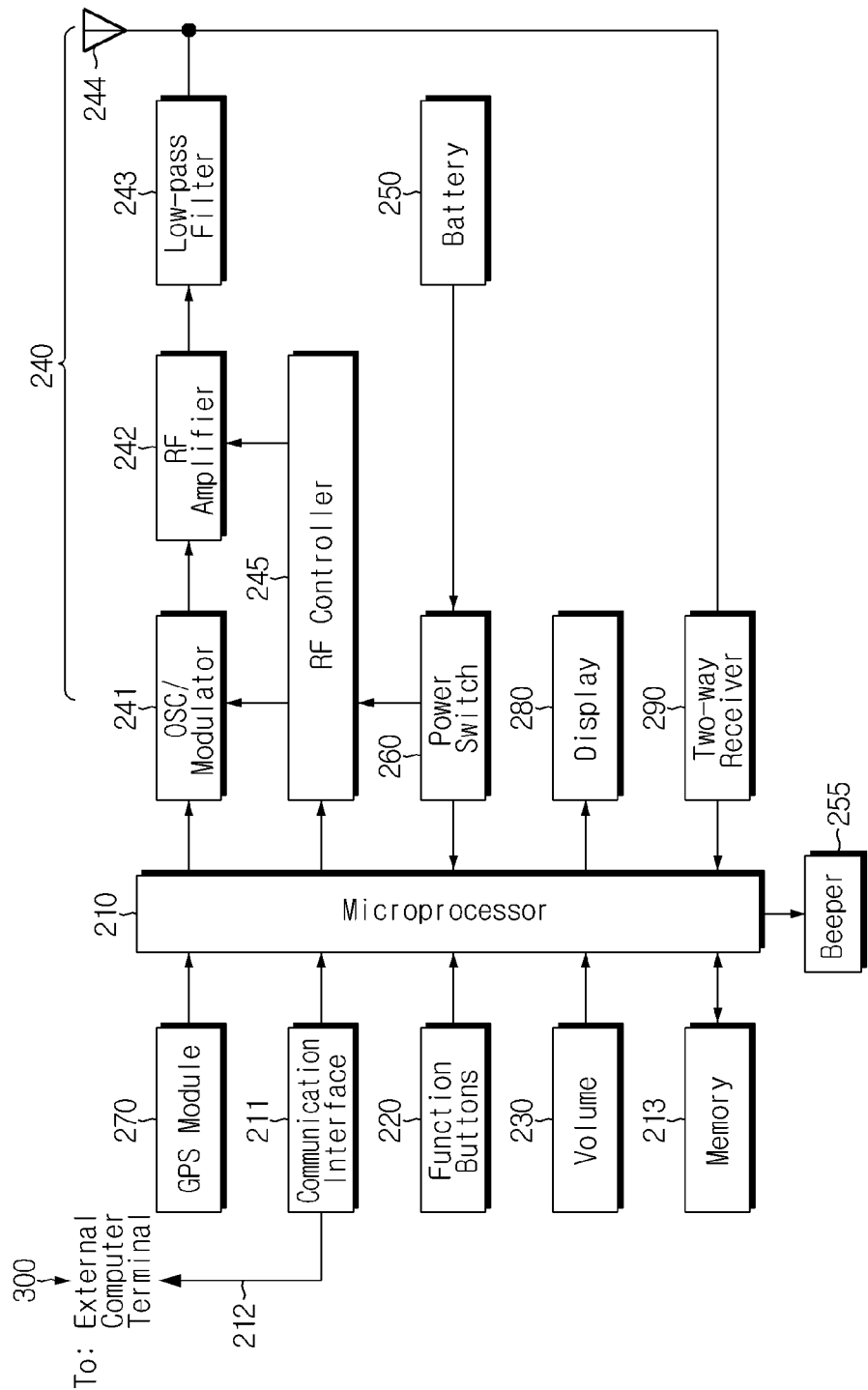
FIG. 5 is a block diagram illustrating components of a remote controller shown in FIG. 3.

FIG. 3 is a perspective view illustrating a reconfigurable animal training apparatus according to another exemplary embodiment of the present disclosure and an external computer terminal for reconfiguration, and FIGS. 4 and 5 are block diagrams each illustrating the components of the animal training apparatus and the remote controller shown in FIG. 3.

Referring to FIG. 3, the animal training apparatus of this embodiment includes a training apparatus 100' worn on an animal to deliver stimulation for correcting the animal's behavior when the animal does a bad behavior, and a remote controller 200 possessed by a user to control the animal training apparatus 100', and the remote controller 200 and the animal training apparatus 100' are configured to conduct wireless communications with each other.

The animal training apparatus 100' of this embodiment has a basic structure nearly similar to the animal training apparatus 100 of the previous embodiment. However, because the animal training apparatus 100' has a wireless communication module 180 for wireless communications with the remote controller 200, and an object to be reconfigured (reprogrammed) is the remote controller 200 as described below, the animal training apparatus 100' does not need to have a communication interface (111 and 112 in the previous embodiment). Also, a microprocessor 110' does not need to be reprogrammable.

As compared to the animal training apparatus 100 of the previous embodiment, the wireless communication module 180 added to the animal training apparatus 100' of this embodiment includes an antenna 181, a radio-frequency amplifier 182, an oscillator 183, a mixer 184, an intermediate-frequency amplifier 185, a filter 186, and a detector 187 as shown in FIG. 4. The antenna 181 receives RF signals transmitted from the remote controller 200, and the radio-frequency amplifier 182 amplifies weak RF signals induced into the antenna 181. The oscillator 183 is a self-oscillator for obtaining second intermediate frequency, and signals generated by the oscillator 183 are combined with the RF signals from the radio-frequency amplifier 182 by the mixer 184 into second intermediate frequency signals. The intermediate-frequency amplifier 185 amplifies the intermediate frequency signals produced from the mixer 184, and the filter 186 filters out noise from the intermediate frequency signals produced from the mixer 184. The detector 187 detects operation signals and control signals such as ID codes sent from the remote controller 200, and the detected control signal is inputted to the microprocessor 110' through a low-frequency amplifier.

Although not necessary, the animal training apparatus 100' of this embodiment may have a global positioning system (GPS) module 175 or a two-way transmitter 190. The GPS module 175 receives signals from a satellite, and inputs location information of the animal to the microprocessor 110'. The two-way transmitter 190 transmits the location information of the animal or information associated with the animal training apparatus 100' such as remaining amount information of the battery 150 to the remote controller 200 through the antenna 181.

The microprocessor 110' receives an input of the control signal from the remote controller 200 through the wireless communication module 180, and controls the operation of the stimulation generator/stimulator module 120, 130, and 140. That is, in this embodiment, the microprocessor 110' passively operates under the control of the remote controller 200 as opposed to the microprocessor 110 of the previous embodiment.

Although not necessary, the animal training apparatus 100' may have the sensor 170 in the same way as the previous embodiment. In this case, the microprocessor 110' may actively operate to deliver stimulation to the animal based on the signal from the sensor 170, similar to the microprocessor 110 of the previous embodiment. However, transition to an active operation mode itself is made by the user under the control of the remote controller 200.

Also, although not necessary, the animal training apparatus 100' may have a light emitting means 155 such as a LED lamp. The light emitting means 155 is a means that is turned on at night to implement a function of allowing for easy detection of the location of the animal (the animal training apparatus), rather than a stimulation source used to be delivered to the animal. A process of activating a lighting function of the light emitting means 155 (detecting the location of the animal training apparatus) will be described below.

The remote controller 200 of this embodiment is a handheld transmitter possessed by the user in a general animal training system. Thus, the remote controller 200 has elements of a general remote controller for setting/selecting a stimulation mode or executing various functions, for example, a button or a switch, a microprocessor, a battery, and a display.

That is, referring to FIGS. 3 and 5, the remote controller 200 has a user input means to select a stimulation mode including the type, duration, and/or intensity of stimulation to be delivered by the animal training apparatus 100' or select functions provided by the animal training system and input an execution command, a wireless communication module 240 to transmit signals representing the stimulation mode or function selected by the user input means to the animal training apparatus, a microprocessor 210 to process the signals and control the wireless communication module 240, a battery 250, and a power switch 260.

The user input means includes a plurality of buttons 220 or switches and a dial 230 to set the type, intensity, and duration of stimulation to be delivered to the animal through the animal training apparatus 100'. The dial 230 is a switch which adjusts the intensity or frequency of stimulation currently selected (electrical stimulation, sound stimulation, and vibration stimulation), and the function buttons 220 are used to select the type of stimulation and input an execution command, initialize or register the remote controller 200 or the animal training apparatus 100', or change the settings. Here, at least some of the user input means or functions are reconfigurable by the user, and a detailed description is provided together with the stimulation mode.

The wireless communication module 240 includes an oscillator/modulator 241, a radio frequency (RF) amplifier 242, a low-pass filter 243, an antenna 244, and a RF controller 245. The oscillator/modulator 241 modulates signals inputted from the microprocessor 210 that will be transmitted by a wireless communication method, and the RF amplifier 242 amplifies RF signals from the oscillator/modulator 151. The low-pass filter 243 blocks harmonics other than the fundamental waves in the amplified RF signals, and the antenna 244 transmits the RF signals composed of the fundamental waves having passed through the low-pass filter 243. Also, the RF controller 245 supplies power to operate the oscillator/modulator 241 and the RF amplifier 242 to transmit control signals to the animal training apparatus 100' in response to an input from the user through the user input means of the remote controller 200.

The battery 250 supplies required power to each component of the remote controller 200, especially the microprocessor 210 and the wireless communication module 240, and preferably includes a rechargeable secondary battery.

The power switch 260 is a switch which switches ON/OFF the remote controller 200. Also, similar to the animal training apparatuses 100 and 100', the remote controller 200 may have a regulator (not shown) which is connected to the power switch to constantly maintain the voltage of power supplied from the battery 250.

The remote controller 200 of this embodiment may further include a display 280. The display 280 displays the type, intensity, and frequency of stimulation selected/set by the user input means or the settings of the remote controller 200 or the animal training apparatus 100', and further, the remaining amount of the battery 250 of the remote controller 200. A specific example of the display 280 will be described below by referring to FIG. 6 together with a detailed description of the stimulation mode.

Although not necessary, the remote controller 200 of this embodiment may have a GPS module 270 or a two-way receiver 290. The GPS module 270 receives signals from a satellite and displays location information of the user or the remote controller on the display 280. Also, as described above, when the animal training apparatus 100' has the GPS module 175 and the two-way transmitter 190 and transmits current location information of the animal or remaining amount information of the battery 150 of the animal training apparatus 100' to the remote controller 200, the GPS module 270 may also display a distance from the user to the animal and its direction, a movement speed of the animal, and remaining amount information of the battery 150 of the animal training apparatus 100' on the display 280.

The remote controller 200 of this embodiment may further include a beeper 255 or a light emitting means (not shown) such as a LED lamp. The beeper 255 or light emitting means may be used for the user to detect the location of the remote controller 200, and this function will be described below.

The microprocessor 210 controls the entire operation of the animal training system including the animal training apparatus 100' and the remote controller 200. The microprocessor 210 is typically implemented as an IC chip, and may have a necessary memory 213 or register, and the operation of the microprocessor 210 may be implemented as control logic programmed in software, firmware, and a hardwired logic.

Particularly, in this embodiment, at least a portion of the control logic of the microprocessor 210 is reprogrammable by the user to make at least some of the user input means or functions reconfigurable. This reconfiguration/reprogramming may be accomplished through a particular button of the user input means, and may be accomplished through the external computer terminal 300 which is electrically connected to the remote controller 200.

When the external computer terminal is used to reconfigure at least some of the user input means or functions, the remote controller 200 has a communication interface to electrically connect the microprocessor 210 to the external computer terminal 300. Although the communication interface is implemented as a wired communication method including a USB port 211 and a USB communication cable 212 in the examples of FIGS. 3 and 5, the communication interface may be implemented as a wireless communication method such as, for example, Bluetooth.

Furthermore, for reconfiguring the user input means or functions (reprogramming the control logic), an application program is installed in the external computer terminal 300 electrically connected to the remote controller 200 with the communication interface to retrieve the control logic of the microprocessor 210 and change the same in response to an input from the user. Although the examples shown in FIGS. 3 and 5 illustrate the external computer terminal 300 as a laptop computer, it is obvious that the external computer terminal may include a desktop computer, a tablet computer, and a smartphone.

Figure 7:
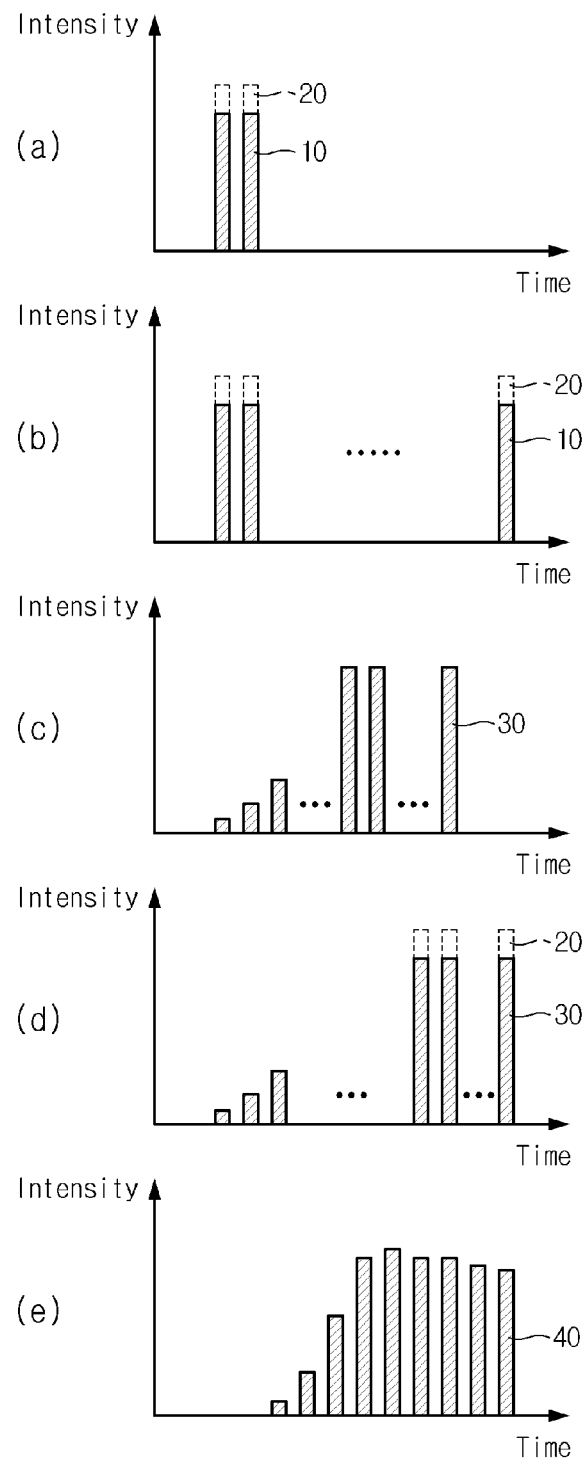
FIG. 7 shows waveform diagrams illustrating a pulse waveform of electrical stimulation delivered to an animal for each stimulation mode in an animal training system shown in FIG. 3.

Prior to the description of the reconfiguration process in the remote controller 200 of this embodiment, specific examples of stimulation modes and functions provided by the animal training system of this embodiment is described by referring to FIGS. 6 and 7 together with specific examples of the display 280.

First, as shown in (a) of FIG. 6, the display 280 displays the settings of the remote controller 200 or the animal training apparatus 100' and the stimulation mode in the form of icons 281~288 or a text using a LCD or LED. That is, when a corresponding mode or function is selected, or based on a current condition, each icon 281~288 is selectively lighted up. The stimulation mode or function represented by each icon 281~288 on the display 280 is described in the table as shown in (b) of FIG. 6, and a detailed description is as follows.

The icons 281 of English alphabet and symbol '+' arranged at the upper part of the display 280 represent each mode of stimulation (especially, electrical stimulation) delivered by the animal training apparatus 100'.

Specifically, among the icons 281, 'M' is lighted up to indicate a mode (Momentary Stimulation Mode, hereinafter simply referred to as 'M Mode') in which electrical stimulation of a level (intensity) currently set by the dial 230 is momentarily delivered (in the form of a single pulse or a few pulses) through the electrode 123 of the animal training apparatus 100'. Each time the function button (any one of 221~225) assigned to the stimulation mode is pressed, the stimulation mode runs for a preset short time (e.g., 1~3 seconds) irrespective of the period of time during which the button is pressed (see Reference Numeral 10 in (a) of FIG. 7).

Among the icons 281, 'C' is lighted up to indicate a mode (Continuous Stimulation Mode, hereinafter briefly referred to as 'C Mode') in which electrical stimulation of a level (intensity) currently set by the dial 230 is delivered while the corresponding button (any one of 221~225) is being pressed through the electrode 123 of the animal training apparatus 100' (see Reference Numeral 10 in (b) of FIG. 7).

Among the icons 281, 'R' is lighted up to indicate a mode (Ramp Mode, hereinafter briefly referred to as 'R Mode') in which electrical stimulation automatically increasing from level 0 to a level (intensity) currently set by the dial 230 for a preset time (e.g., 1 second) and subsequently fixed to the level is delivered while the corresponding button (any one of 221~225) is being pressed through the electrode 123 of the animal training apparatus 100' (see Reference Numeral 30 in (c) of FIG. 7).

Among the icons 281, a '+' icon are lighted up together with 'M', 'C', and 'R' (such as 'M+', 'C+', 'R+') to indicate a mode (Boost Mode, hereinafter respectively referred to as 'M+ Mode', 'C+ Mode', and 'R+ Mode') in which electrical stimulation of a level higher by a preset level than a level (intensity) currently set by the dial 230 from a level of stimulation delivered through the electrode 123 of the animal training apparatus 100' is delivered in each stimulation mode (M, C, and R modes) (see Reference Numeral 20 in (a), (b), and (d) of FIG. 7).

Among the icons 281, 'I' is lighted up to indicate a mode (Instant Mode, hereinafter referred to as 'I Mode') in which electrical stimulation changing from level 0 to a level (intensity) currently set by the dial 230 is delivered only by the dial 230 without continuously pressing the corresponding button 221~225 through the electrode 123 of the animal training apparatus 100' (see Reference Numeral 40 in (e) of FIG. 7). Entry into this stimulation mode is accomplished by adjusting the dial 230 to set a stimulation level to 0 and short-pressing the corresponding button (any one of 221~225), and afterwards, the stimulation mode continues by the adjustment of the dial 230 and ends when the dial 230 is reduced to 0 or after a preset time (e.g., 30 seconds) passes. This mode is useful in adjusting the dial 230 based on a response of the animal to find a stimulation level suitable for the corresponding animal, and in particular, it is convenient in a situation where the user has difficulty in using both hands.

Among the icons 281, 'V' is lighted up to indicate a mode (Vibration Mode, hereinafter referred to as 'V Mode') in which vibration stimulation is delivered while the corresponding button (any one of 221~225) is being pressed through the vibration means 142 of the animal training apparatus 100'.

Among the icons 281, 'T' is lighted up to indicate mode (Tone Mode, hereinafter referred to as a 'T Mode') in which sound stimulation is delivered while the corresponding button (any one of 221~225) is being pressed through the sound means 132 of the animal training apparatus 100'.

Generally, vibration stimulation and sound stimulation is less stimulative to the animal than electrical stimulation, and in some instance, may be stimulation pleasant for the animal. Thus, vibration stimulation and sound stimulation may be used at a step before a step of delivering electrical stimulation or may be used to encourage the animal, based on a behavior level of the animal.

In the above mentioned stimulation modes, particularly C, R, I, V, and T modes, stimulation is continuously delivered to the animal while the corresponding button is pressed or the dial 230 is adjusted, and as a result, in some instances, excessive stimulation may be delivered. To prevent this, a maximum value of stimulation duration (e.g., 10~30 seconds) may be set irrespective of a period of time during which the button or dial is pressed or adjusted, and the maximum value may be changed as described below. A change process will be described in detail below.

Two 7-segment icons 282 at the center of the display 280 indicate the intensity (level) of stimulation (especially, electrical stimulation) currently set or delivered immediately before, and in this embodiment, electrical stimulation is divided into 100 total levels from 0 to 99 and fine control may be taken based on the sensitivity of the animal to stimulation.

A number icon 283 disposed between the alphabet icon 281 and the 7-segment icon 282 indicates the animal training apparatus 100' (i.e., animal) selected currently or immediately before when a plurality of animal training apparatuses 100' may be simultaneously controlled with one remote controller 200 (i.e., a plurality of animals may be simultaneously trained with one remote controller 200).

A '+' icon 284 disposed at the left part of the display 280 is lighted up when the level increasing at a predetermined amount is set or changed in the above mentioned Boost Mode (M+, C+, and R+ modes), and a detailed description is provided below.

An animal training apparatus shaped icon 285 disposed at the lower right side of the '+' icon 284 is lighted up when a function of detecting the location of the animal by lighting the light emitting means 155 of the animal training apparatus 100' especially at night is performed, and a detailed description is provided below.

A dumbbell shaped icon 286 disposed at the right part of the display 280 is lighted up when pairing and synchronization of the animal training apparatus 100' and the remote controller 200 is performed, and a detailed description is provided below.

A remote controller shaped icon 287 disposed at the lower left side of the dumbbell shaped icon 286 is lighted up when a function of automatically operating the beeper 255 of the remote controller 200 when a preset time passes to let the user know the location of the remote controller 200 is performed, and a detailed description is provided below.

Lastly, an icon 288 disposed below the display 280 is an icon indicating a remaining amount of the battery 250 of the remote controller 200.

The shape or arrangement, and further, the type of each of the icons 281~288 on the display 280 is provided for illustration only and may be changed or added (for example, displaying the location of the animal training apparatus 100' or the remote controller 200 acquired by the GPS modules 175 and 270). Also, the stimulation modes or functions indicated by each of the icons may be changed according to particular embodiments.

Hereinafter, a process of reconfiguring the user input means or functions of the animal training system of this embodiment as described above is described with reference to FIG. 8. As described above, the reconfiguration process may be performed on the external computer terminal 300 using a communication interface, and may be performed on the remote controller 200 without a separate external computer terminal, and the case using the external computer terminal 300 is first described.

First, a communication channel is built between the external computer terminal 300 and the remote controller 200 using the communication interfaces 211 and 212, and concurrently, an application program installed in the external computer terminal 300 is executed.

Subsequently, the application program retrieves control logic (actually, a particular program code or data stored in the memory 213 or register) of the microprocessor 210 intended to reconfigure (reprogram), and displays the same on the display of the external computer terminal 300 in the form of a text or graphics readable by the user. Furthermore, the application program displays the user input means or functions that may be reconfigured by the user together with candidates of changeable or selectable ranges or values, and receives an input of an item (value) to reconfigure when the user selects or input a desired candidate from the candidates.

Figure 8:
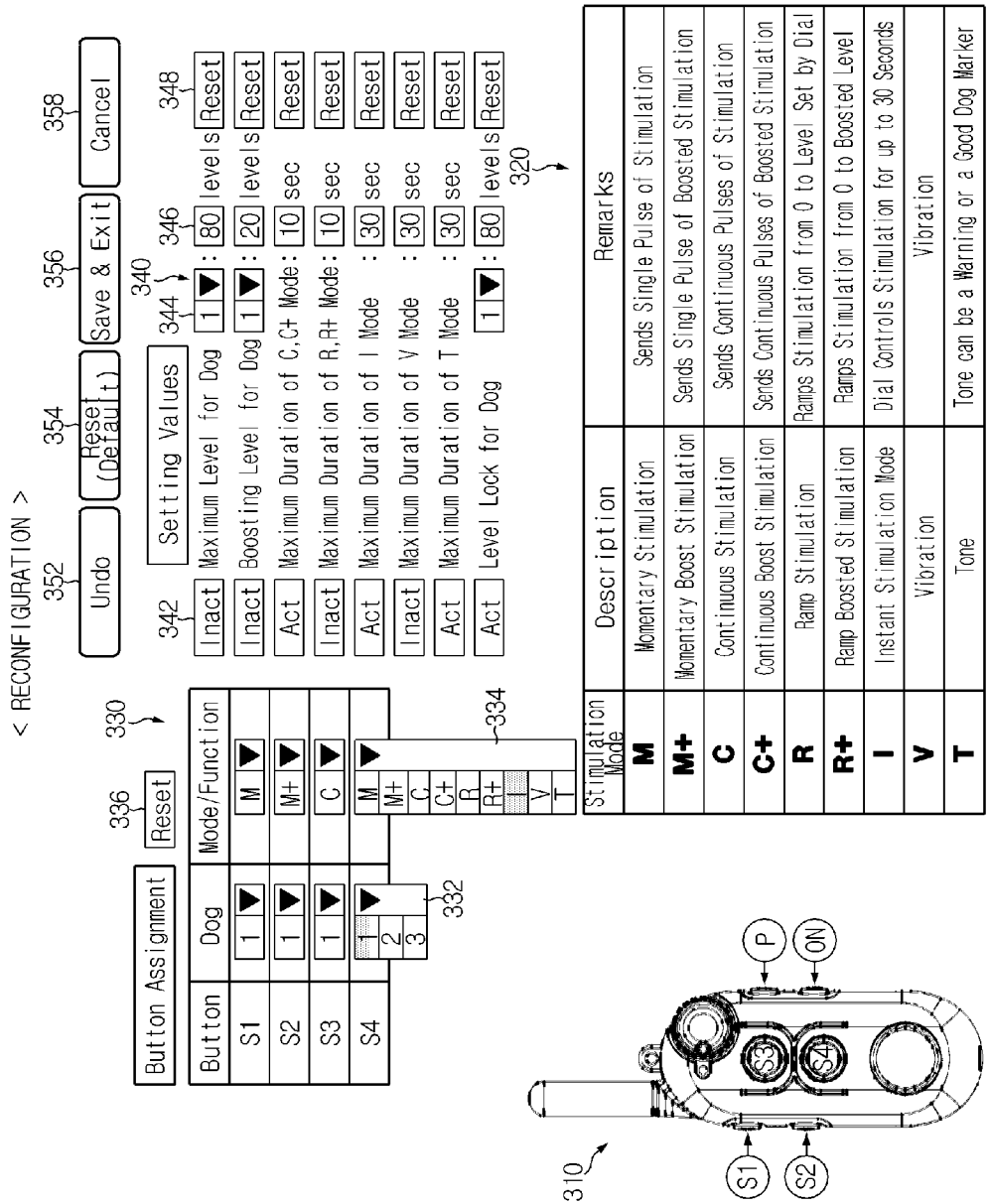
FIG. 8 is a diagram illustrating a user input means of a remote controller using an external computer terminal in an animal training system shown in FIG. 3 and an example of an image displayed on a monitor or a display of the external computer terminal during reconfiguration of functions.

Specifically, seeing FIG. 8 showing an example of an image displayed on the monitor or display of the external computer terminal 300 during the reconfiguration process, an external shape 310 of a remote controller including at least buttons S1~S4, P, and ON is illustrated, and a description 320 of stimulation modes that may be selected by the user is displayed. Also, among the user input means, a user interface 330 for reconfiguration of reconfigurable buttons (four buttons S1~S4 in this embodiment) i.e., for button assignment and a user interface 340 for setting/changing maximum values of stimulation level are displayed.

Thus, the user may freely edit and assign a desired stimulation mode for each button S1~S4 using a pop-up window 334 of the user interface 330 for button assignment by referring to the description 340 of the stimulation modes, and in the training of a plurality of animals, a desired animal may be assigned for each button by use of a pop-up window 332. Also, when a 'Reset' button 336 is pressed, stimulation modes assigned for each button S1~S4 may be initialized.

Also, with the user interface 340 for setting/changing various values, the user may set, change, and reset (initialize) a maximum value of stimulation (especially, electrical stimulation) that may be delivered for each animal, a boosting level in Boost Mode, a maximum stimulation duration in C, C+, R, R+, I, V, and T modes, and a stimulation level lock function for each animal. Further, whether to apply the corresponding values (whether to activate the corresponding functions) may be shifted by pressing an 'Inact/Act' button 342 of toggle button type. In this instance, when the corresponding function is inactivated (when the 'Inact/Act' button 342 of the corresponding function indicates 'Act'), indication of a corresponding line is blurred to make the user easily know a current state, and even when a pop-up window 344, an input window 346, and a reset button 348 are selected, it is preferred to inactivate the corresponding function not to operate it.

After the reconfiguration process by the user is completed, when the user presses a 'Save & Exit' button 356, the application program controls the microprocessor 210 to change the control logic set/reconfigured by the user to the item (value) selected by the user.

In addition to the 'Save & Exit' button 356, an 'Undo' button 352 for cancelling the setting/selection carried out immediately before, a 'Reset' button 354 for initializing the overall setting, and a 'Cancel' button 358 for cancelling and terminating the reconfiguration operation may be provided to ease the reconfiguration process.

Although FIG. 8 shows that stimulation modes or functions of four buttons S1~S4 may be reconfigured (assigned), it is obvious that functions of other buttons P and ON may be reconfigured. Also, it is possible to act/inact other functions not shown in FIG. 8, for example, a function of detecting the location of the animal as described with reference to the animal training apparatus shaped icon 285 of FIG. 6 or a function of operating the beeper 255 of the remote controller 200 after the passage of a preset time as described with reference to the remote controller shaped icon 287.

Next, an example in which the above mentioned reconfiguration process is implemented on the remote controller 200 without an external computer terminal is described with reference to FIGS. 3 and 6.

Although more limitative than the external computer terminal 300, the process of reconfiguring the user input means and some functions on the remote controller 200 may be performed by the user using the user input means, the button 220, the dial 230, and the switch 260, while the user is viewing the display 280.

As described above, the animal training system of this embodiment simultaneously control a plurality of animal training apparatus 100' (three in this embodiment) with one remote controller 200. To do so, the buttons 221~224 may be each assigned as buttons for controlling different animal training apparatuses 100', and in the specification, it is called pairing, and a pairing process is described as below.

First, pairing for a first animal training apparatus 100' is performed. To do so, when a particular button (e.g., a button denoted by Reference numeral 225 in FIG. 6) of the remote controller 200 is long-pressed (for example, 1 second or longer), the display 280 flickers and the two 7-segment icons 282 show, for example, 'PR', indicating entry into a reprogramming mode in which the user input means and some functions are reconfigured.

Subsequently, the power switch 260 is short-pressed repeatedly until the dumbbell shaped icon 286 on the display 280 is lighted up. Subsequently, when the first animal training apparatus 100' approaches the remote controller 200 in the power off state of the first animal training apparatus 100', a magnet embedded in the animal training apparatus 100' works and the LED 155 of the animal training apparatus 100' flickers in a predetermined color (e.g., green). After the flickering is detected, a button (e.g., 221 and 222) of the remote controller 200 used to control the first animal training apparatus 100' is pressed. Subsequently, the corresponding buttons 221 and 222 are assigned to the first animal training apparatus 100', and when the particular button 225 is pressed again, the pairing process of the first animal training apparatus 100' finishes.

Pairing processes of second and third animal training apparatuses 100' are identical to the above pairing process of the first animal training apparatus 100'.

Next, a process of assigning a particular stimulation mode to each button 221~224 of the remote controller 200 is described.

First, as described above, the particular button (e.g., 225) is long-pressed to enter a reprogramming mode, and a button (any one of 221~224) intended to assign a stimulation mode is short-pressed. Subsequently, a letter corresponding to a stimulation mode currently set (or by default set when releasing a product) to the corresponding button on the alphabet icon 281 is lighted up, and when short-pressing of the corresponding button is repeated again, the alphabet icon 281 is lighted up, for example, in an order of V, T, M, M+, C, C+, R, R+, I, and V, and the stimulation mode is assigned to the corresponding button. When a desired stimulation mode is assigned to each button 221~224 by iteratively performing the above process on the buttons 221~224 to which a stimulation mode is to be assigned in this way, the particular button 225 is pressed again to terminate the reprogramming mode and revert to the active use mode of the remote controller.

In this instance, for example, to set to lock the stimulation level delivered in M mode or C mode (i.e., to fix the stimulation delivered to the animal to a stimulation level currently set to lock even though the dial 230 is rotated), when M or C of the alphabet icon 281 is lighted up, the dial 230 is rotated to set a desired fixed stimulation level (when the dial is rotated, a stimulation level is indicated as a number on the two 7-segment icons 282, and while the number is being viewed, the stimulation level is set based on the number). Subsequently, when the corresponding button is long-pressed, a number corresponding to the number of the animal training apparatus 100' assigned to the button among the number icon 283 of the display 280 is lighted up and the stimulation level in the M mode or C mode of the animal training apparatus is set to lock.

To unlock the stimulation level, the above locking process is repeated. That is, entry into a reprogramming mode is made, and when the corresponding button is pressed to light M or C, and when the corresponding button is long-pressed again, a number corresponding to a number of the animal training apparatus 100' assigned to the button among the number icon 283 of the display 280 changes from a lighted state to a flickering state. This represents that unlocking was accomplished. Finally, when the particular button 225 is pressed, the reprogramming mode ends.

Next, a process of setting an amount of the stimulation level to increase in Boost mode is described.

Likewise, the particular button 225 is long-pressed to enter a reprogramming mode. Subsequently, the power switch 260 is short-pressed repeatedly until the + icon 284 on the display 280 is lighted up. Subsequently, the stimulation level to increase in the Boost mode is adjusted by rotating the dial 230 while viewing the number displayed on the 7-segment icon 282. Subsequently, the stimulation level is set by pressing a button (any one of 221~224) to which the stimulation mode of the target animal training apparatus 100' for the corresponding Boost mode is assigned. Finally, the particular button 225 is pressed, the reprogramming mode ends.

Next, a process of setting a function of turning on the light emitting means 155 of the animal training apparatus 100' to detect the location of the animal especially at night is described.

Likewise, the particular button 225 is long-pressed to enter a reprogramming mode. Subsequently, the power switch 260 is short-pressed repeatedly until the animal training apparatus shaped icon 285 on the display 280 is lighted up. Subsequently, when a button (any one of 221~224) assigned to the animal training apparatus 100' of which the location is to be detected is pressed, the light emitting means 155 of the corresponding animal training apparatus 100' is turned on. Finally, the particular button 225 is pressed, the reprogramming mode ends.

To release this function, that is, to turn off the light emitting means 155 of the corresponding animal training apparatus 100' after detecting the location of the corresponding animal training apparatus 100', a process of activating the function is repeated again.

Next, a setting process of a function of operating the beeper 255 of the remote controller 200 to notify the user of the location of the remote controller 200 is described.

Likewise, the particular button 225 is long-pressed to enter a reprogramming mode. Subsequently, the power switch 260 is short-pressed repeatedly until the remote controller shaped icon 287 on the display 280 is lighted up. Subsequently, when an arbitrary one of the buttons 221~224 is pressed, the setting is completed, and when the particular button 225 is pressed, the reprogramming mode ends.

To release this function, i.e., to turn off the beeper 255 of the remote controller 200, a process of activating the function is repeated again.

Although the above reconfiguration process using the remote controller 200 shows that stimulation modes or functions for four buttons S1~S4 are reconfigured (assigned), it is obvious that functions of other buttons P and ON may be reconfigured. Further, although a detailed description is omitted herein, other reconfiguration, for example, reconfiguration such as setting/changing a maximum value of stimulation delivered for each animal training apparatus (each animal) or a maximum stimulation duration for each type or mode of stimulation may be contemplated.

As described above, the animal training system of this embodiment allows the user to reset, reconfigure, and reprogram the user input means of the remote controller 200 or various functions provided by the animal training system in the convenient, simple, and easy manner.

Where the external computer terminal 300 is used to perform reconfiguration (reprogramming) in the animal training apparatus and system according to the present disclosure, a test for release or maintenance and repair of a product (remote controller or animal training apparatus) may be conducted through making a little modification to the application program. That is, in the system as shown in FIG. 1 or 3, the external computer terminal 300 is electrically connected to each animal training apparatus 100 or the remote controller 200 using a communication interface, the control logic of the animal training apparatus 100 or the remote controller 200 is retrieved, and a control operation performed by the control logic is simulated on the external computer terminal 300. In this instance, the specification and functions of a test product are displayed on the screen of the external computer terminal 300 in the form of a text or graphics recognizable by the user, to provide an interactive user interface to allow the user to selectively or simultaneously test them.

Hereinabove, the animal training apparatus and the animal training system according to the present disclosure has been described. While the present disclosure has been described by particular embodiments, various modifications and changes may be made to the present disclosure by person having ordinary skill in the technical field to which the present disclosure belongs without departing from the spirit and scope of the present disclosure. Therefore, the present disclosure is not limited to the scope narrower than the scope of the appended claims.

What is claimed is:

1. An animal training system comprising an animal training apparatus worn on an animal to deliver stimulation to the animal and a remote controller possessed by a user to control the animal training apparatus, the remote controller and the animal training apparatus configured to communicate with each other via wireless communication,
   the animal training apparatus comprising:
       a stimulation generator/stimulator module to generate the stimulation and deliver the stimulation to the animal;
       a wireless communication module to receive a signal from the remote controller; and
       a microprocessor configured to control the stimulation generator/stimulator module to deliver the stimulation to the animal based on the signal received by the wireless communication module, and
   the remote controller comprising:
       a user input means to select a particular stimulation mode from a plurality of stimulation modes differing in type, duration, and/or intensity of the stimulation to be delivered by the animal training apparatus or a particular function from a plurality of functions provided by the animal training system and input an execution command of the selected stimulation mode or function;
       a wireless communication module to transmit signals representing the stimulation mode or function selected by the user input means to the animal training apparatus; and
       a microprocessor to process the signals and control the wireless communication module,
   wherein at least a portion of the user input means or functions is reconfigurable by the user,
   wherein the user input means of the remote controller includes a plurality of buttons each assigned corresponding to a particular stimulation mode or a particular function, and
   wherein a corresponding relationship between the plurality of buttons and the plurality of stimulation modes or functions are reconfigurable by the user.

2. The animal training system according to claim 1, wherein the remote controller further comprises a communication interface to electrically connect the microprocessor of the remote controller to an external computer terminal wiredly or wirelessly, and
   reconfiguration of the at least a portion of the user input means or functions is carried out by the external computer terminal using the communication interface.

3. The animal training system according to claim 2, wherein the external computer terminal is any one of a desktop computer, a laptop computer, a tablet computer, and a smartphone.

4. The animal training system according to claim 1, wherein the remote controller further comprises a display to display currently set stimulation modes or functions in the form of an icon and/or a message,
   the user input means of the remote controller includes a plurality of buttons each assigned corresponding to a particular stimulation mode or a particular function, and
   reconfiguration of the at least a portion of the user input means or functions is carried out by the user pressing a particular button among the plurality of buttons, and the reconfiguration process is displayed on the display.

5. The animal training system according to claim 1, wherein the animal training system comprises one remote controller and a plurality of animal training apparatuses each worn on different animals, and the plurality of buttons is assigned corresponding to the animal training apparatuses worn on the different animals singularly or in group to simultaneously train the plurality of animals with one remote controller, and a corresponding relationship between the plurality of buttons and the plurality of animal training apparatuses is reconfigurable by the user.

6. The animal training system according to claim 5, wherein the plurality of buttons includes a lock function of setting and locking an intensity and/or a duration of stimulation to be delivered to each animal wearing each of the plurality of animal training apparatuses independently for each animal training apparatus, and setting or unlocking of the lock function and/or the intensity and/or duration of stimulation to be delivered to each animal is reconfigurable by the user.

7. The animal training system according to claim 1, wherein the plurality of stimulation modes includes a maximum stimulation restriction mode in which despite the user's command to deliver stimulation exceeding a preset maximum value of intensity and/or duration of stimulation to be delivered to the animal, the stimulation is limited to the preset maximum value and is delivered to the animal, and setting or releasing of the maximum stimulation restriction mode and/or the maximum value is reconfigurable by the user.

8. The animal training system according to claim 1, wherein the user input means of the remote controller comprises a dial to adjust the intensity of stimulation to be delivered to the animal, and the plurality of stimulation modes include a ramp mode in which the stimulation is delivered with the intensity of stimulation to be delivered to the animal increasing from 0 to an intensity set by the dial.

9. The animal training system according to claim 1, wherein the plurality of stimulation modes includes a boost mode in which the stimulation is delivered with the intensity of stimulation to be delivered to the animal increasing from a currently set intensity by a predetermined amount, and the predetermined amount increasing in the boost mode is reconfigurable by the user.

10. The animal training system according to claim 1, wherein the user input means of the remote controller comprises a dial to adjust the intensity of stimulation to be delivered to the animal, and the plurality of stimulation modes includes an instant mode in which the stimulation is delivered to the animal with the intensity of stimulation set by the dial by manipulating only the dial for a preset time.

11. The animal training system according to claim 1, wherein the animal training apparatus further comprises a light emitting means, and the plurality of function includes a function of lighting the light emitting means by the remote controller.

12. The animal training system according to claim 1, wherein the remote controller further comprises a beeper, and the plurality of functions includes a function of activating the beeper when a preset time passes.

* * * * *